Dec. 3, 1940.  M. RASCH  2,223,576
CAR-ROCKING DEVICE
Filed Aug. 3, 1939   3 Sheets-Sheet 1
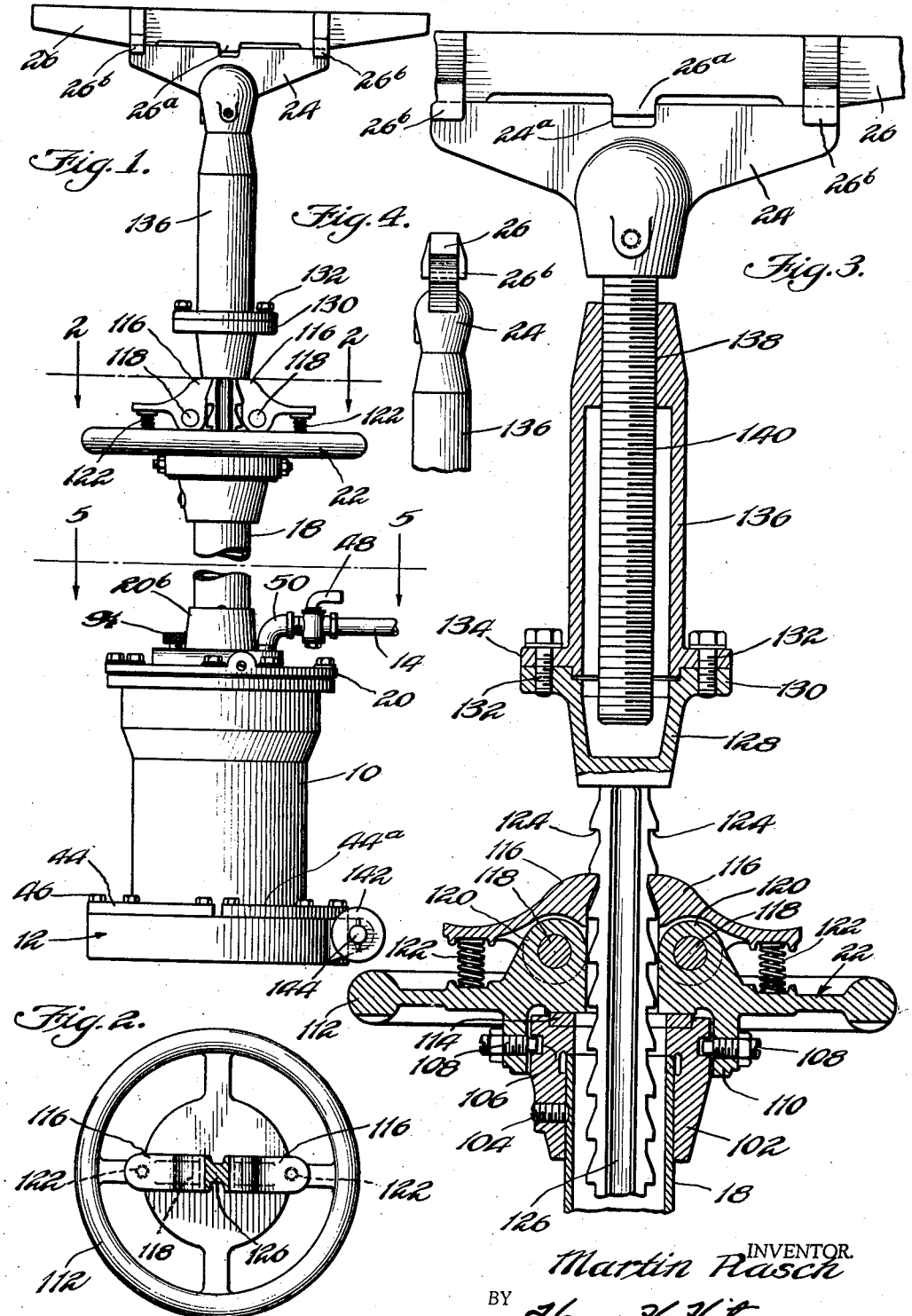
INVENTOR.
Martin Rasch
BY Harry H. Hitzeman
ATTORNEY.

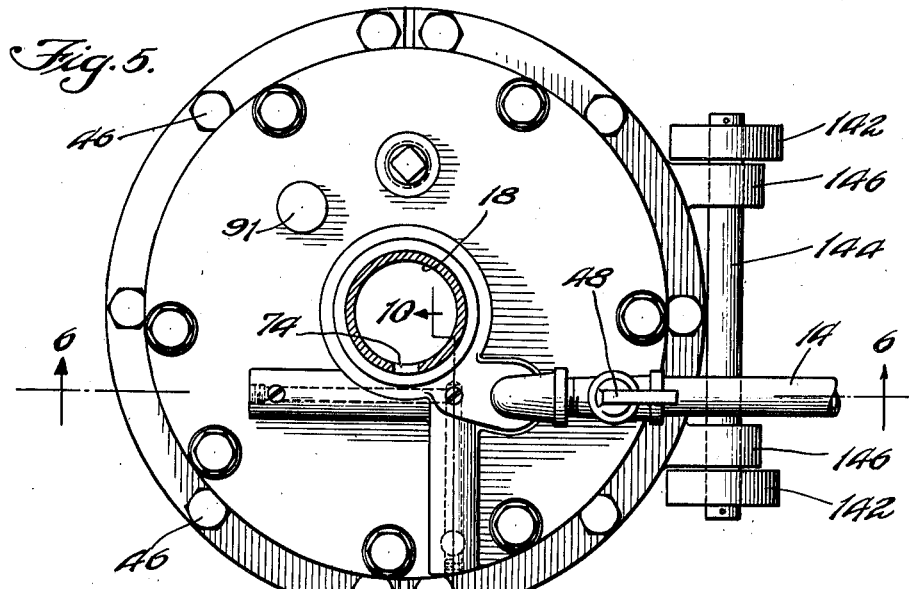
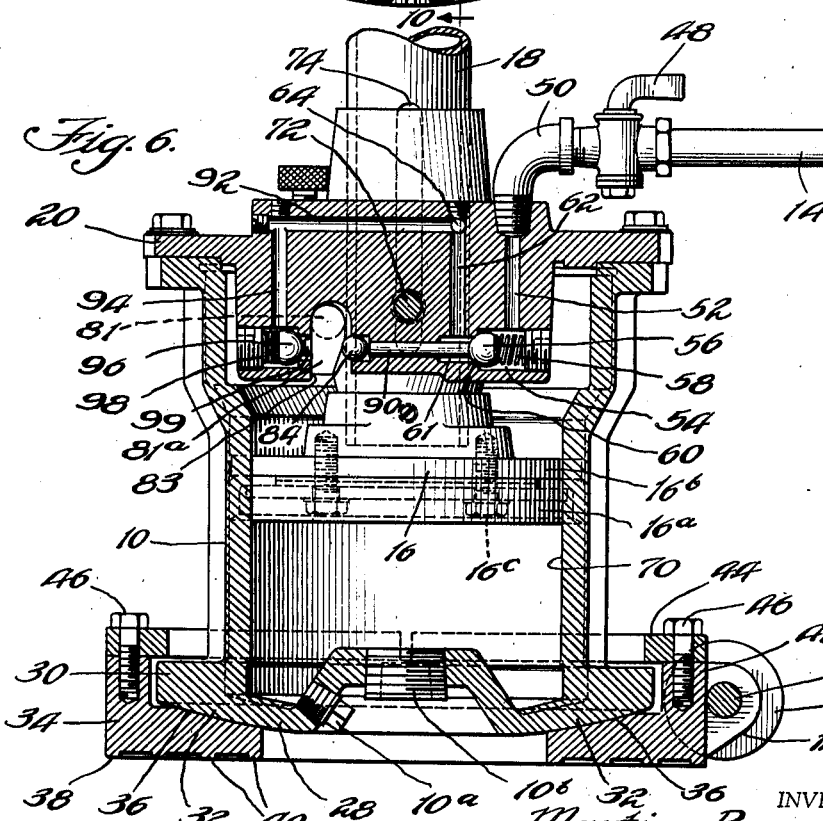

Dec. 3, 1940.     M. RASCH     2,223,576
CAR-ROCKING DEVICE
Filed Aug. 3, 1939     3 Sheets-Sheet 3
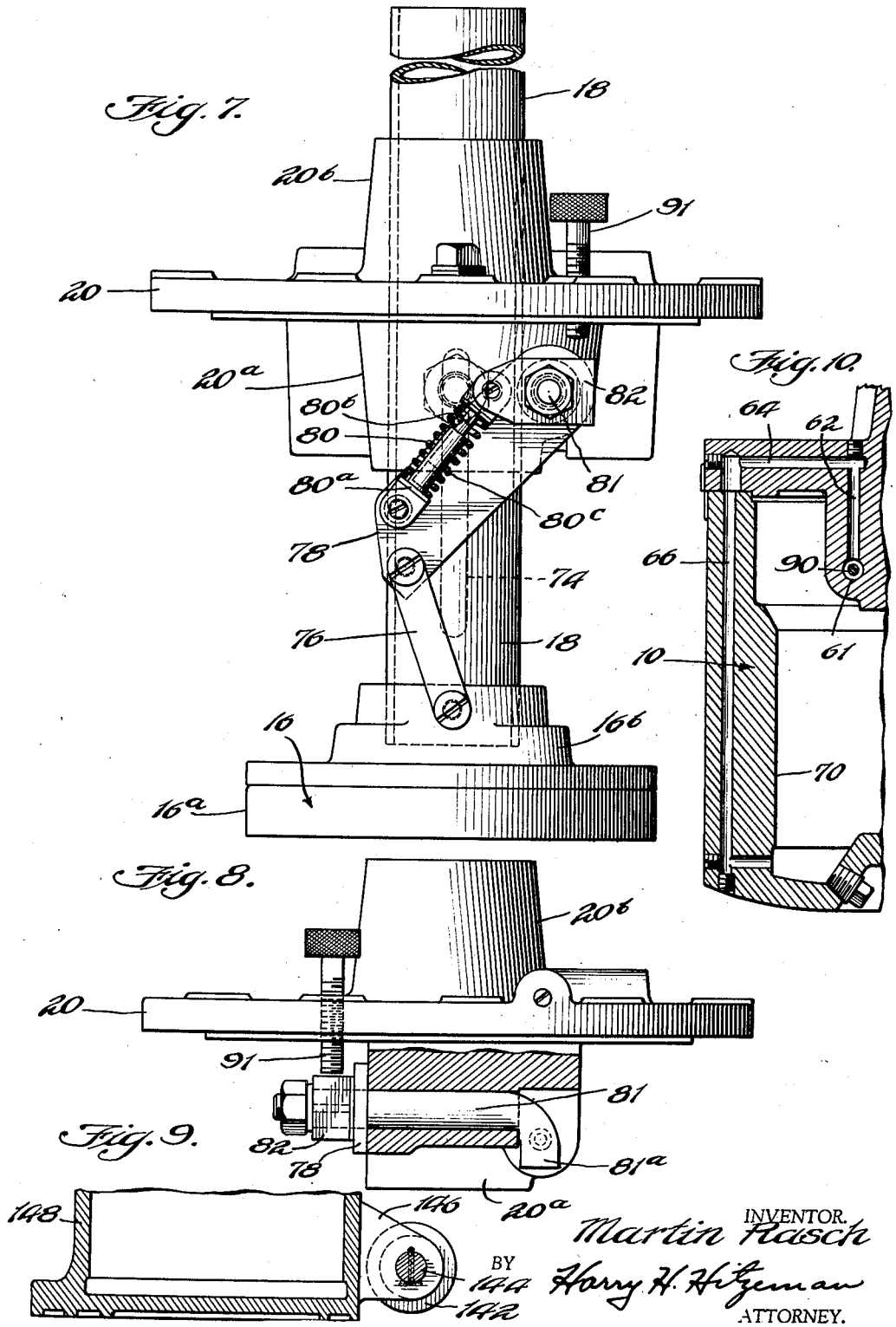
INVENTOR.
Martin Rasch
BY Harry H. Hitzeman
ATTORNEY.

Patented Dec. 3, 1940

2,223,576

UNITED STATES PATENT OFFICE 2,223,576

CAR-ROCKING DEVICE

Martin Rasch, Chicago, Ill., assignor to Chicago Jack Company, a corporation of Illinois Application August 3, 1939, Serial No. 288,141

3 Claims. (Cl. 73—51)

My invention relates to car-rocking apparatus and similar devices.

My invention relates more particularly to apparatus of the type described adapted for use in servicing or lubricating and greasing the under parts of automotive vehicles and especially for greasing the springs and spring shackles.

In greasing springs and spring shackles in the manner I have mentioned, it has been found that the grease or other lubricant will penetrate between the spring leaves and around the shackle bolts more readily and uniformly if the automobile frame is vibrated during such greasing.

Accordingly, I have provided an improved car-rocking device capable of being used in the usual greasing pit, auto lift or ramp of a garage, automobile repair shop or service station, to provide a rocking action to the vehicle being lubricated while over the grease pit, auto lift or ramp.

The principal object of my invention is to provide an improved construction of car-rocking device capable of operation by compressed air to provide the necessary intermittent "up and down" movement at the desired rate of speed.

A further object of my invention is to provide an improved apparatus of the type described that can be easily moved about in the greasing pit upon rollers provided adjacent its base, yet which rollers are removed from the floor of the pit when the apparatus is being used.

A further object of my invention is to provide an improved construction of apparatus of the type described including means for angularly disposing the apparatus upon a sloping floor of a greasing pit in such a position that the saddle or yoke which raises the car will be supported in an absolutely vertical position.

A further object of my invention is to provide a car-rocking device having improved saddle adjusting means including a quick adjustment to approximate height and an adjusting screw member for minute adjustment.

A further object of my invention is to provide an improved car-rocking device that is easily and simply constructed, yet so designed that it will give long wear and be capable of considerable abuse without becoming broken or out of order.

Other objects and advantages will be more apparent from the following description wherein reference is had to the accompanying three sheets of drawings, upon which Fig. 1 is a side elevational view of my improved car-rocking device;

Fig. 2 is a plan sectional view of the adjusting means for the saddle;

Fig. 3 is a fragmentary sectional view of the upper portion of the car-rocking device including an adjusting means for the saddle;

Fig. 4 is a fragmentary side elevational view of the top of the support member and the saddle;

Fig. 5 is a plan sectional view taken generally on the lines 5—5 of Fig. 1;

Fig. 6 is a vertical sectional view through the cylinder and control means for the piston taken generally on the lines 6—6 of Fig. 5;

Fig. 7 is a side elevational view of the cylinder cover piston and valve release mechanism;

Fig. 8 is a side elevational view of the cylinder cover with parts broken in section to show the valve control means;

Fig. 9 is a fragmentary sectional view of a modified form of cylinder with a solid base, and Fig. 10 is a fragmentary sectional view taken generally on the lines 10—10 of Fig. 5.

In the embodiment of the invention which I have chosen to illustrate, I have shown a cylinder 10 supported upon a base member 12 and provided with a source of air under pressure through a conduit 14. The assembly may include generally the piston 16, a support member 18 rigidly secured thereto and extending upward through the cover 20 of the cylinder. The support 18 may have associated therewith the adjusting means 22, a top bar 24 rigidly connected thereto, and a removable saddle or support bar 26.

Referring to Figs. 5 and 6, the cylinder 10 may be provided with a base portion 28 that has a lateral encircling flange 30 and the partially rounded bottom wall portions 32. The bottom of the cylinder may be supported in a base member 34 which is provided with a seat 36 complementary to the wall 32 and provided with a flat bottom wall 38. A plurality of ridges 40 may be provided in the bottom wall of the base 34 for better gripping upon the floor of the greasing pit or floor below the lift or ramp. The base 34 may also be provided with an upright encircling flange 42. A ring member formed of the parts 44 and 44a are secured to the base 34 by suitable bolt members 46 and lock the base loosely to the cylinder 10. Thus with the arcuately shaped surfaces 32 and 36 of the bottom of the cylinder and the seat of the base, it can be seen that the cylinder may be tilted in any direction a number of degrees so that in the event the base is positioned upon an inclined floor as is usually found in a greasing pit or floor below a lift or ramp, the cylinder may still be positioned so that the support 18 will rise in a strictly vertical plane.

As previously mentioned, air from a source of pressure may be supplied to the cylinder 10 through the conduit 14, valve 48 and elbow 50 to a passageway 52 in the cover plate 20. The air may enter a chamber 54 within which a ball check valve 56 and retaining spring 58 are located. When the ball 58 is moved from its seat 60 as will be hereinafter described, the air may pass into chamber 61 and upwardly through passageway 62 and enter a horizontal passageway 64 which communicates with a passageway 66 in the vertical wall of the cylinder 10. This passageway communicates with a horizontal passageway 68 adjacent the lower end of the cylinder 10 and enters the chamber 70 below the piston 16.

In this manner the piston 16 under the action of compressed air will raise in the cylinder, carrying with it the support member 18 that is fixedly attached thereto. The piston 16 may be of the usual type including a cup leather 16a secured to a backing plate 16b by means of screw members 16c. The support member 18 may pass upwardly through suitable bearing portions 20a and 20b in the cover plate 20 of the cylinder. The support may be guided and prevented from rotation by a bolt member 72 which extends through an elongated slot 74 in the support member 18.

In order to secure a continuous intermittent up and down action of the piston 16 in the chamber 70 of the cylinder, I provide a valve mechanism which may include a lever 76 pivotally connected to the piston backing plate 16b and also pivotally connected to an arm 78 which is pivotally connected upon the bolt 81 of the bearing portion 20a of the cover plate 20. The arm 78 may carry a spring assembly 80 which may generally include a hollow arm 80a pivoted upon the arm 78 and a pivotally mounted rod member 80b pivotally mounted upon a toggle member 82. The toggle member 82 is keyed to the bolt 81. A coiled spring 80c normally rests between suitable shoulders on the members 80a and 80b and serves to hold the end of the bolt 81 in the position shown in Figs. 6 and 8. The bolt 81 (Fig. 6) is formed with an extension 81a which normally bears against the shoulder 83 with its opposite face bearing against a ball check valve 84. During the time, however, that air is entering the lower end of chamber 70, the extension 81a is pushing on the ball valve 83 and rod 90 to move the ball valve 56 from its seat, thus permitting air to travel through the passageways 62, 64, 66, 68 and into the lower end of the chamber. As the piston 16 is raised in the cylinder, carrying the arms 76 and 78 with it, the member 80b telescopically mounted in the hollow arm 80a, moves forward; the spring is compressed until the pivot of the member 80a is raised to a point near the horizontal, whereby the action of the compression spring 80c, it will be snapped upward past a horizontal point, and the portion 81a of the bolt 81 will be swung forward against the wall 83 in the cover, to the position shown in Fig. 6.

The adjusting screw 91 mounted in the cover, provides a stop against the member 82. Thus, in the position of the valve mechanism shown in Fig. 6, air in the chamber 70 below the piston, may pass through horizontal passageway 68 upwardly through the passageways 66 and 64 across through the horizontal passageway 92, down through the passageway 94 past the check valve 96 and its spring member 98 and into the upper end of the cylinder through the opening 99. This permits the piston to descend in the cylinder chamber and the air may escape through the slot 74 which is in support member 18. When it is desired to use the car-rocking device as a jack, the adjusting screw 91 may be screwed down in the cover 20 so that its end rests upon the top of member 82, thus preventing the valve mechanism from working.

The support member 18 may extend upwardly through the cover 20 of the cylinder 10 and have a collar 102 connected thereto by means of a set screw 104. The collar 102 is formed with an annular groove 106 in its outside periphery to receive a pair of bolt members 108 that are fastened to a downwardly depending annular flange 110 formed integral with a hand wheel 112. A bearing washer 114 may be positioned between an upper surface of the collar 102 and a lower surface of the hand wheel 112.

The hand wheel 112 may carry a pair of dog members 116 mounted on suitable pivots 118 in upwardly standing ears 120 on the hand wheel 112. The toothed portion of the dog members 116 is normally pressed in a forward position by a compression spring 122 positioned between an extension of the dog and the surface of the hand wheel 112.

The dog members 116 are adapted to engage the teeth 124 of a ratchet member 126 which is telescopically mounted in the support 18 and extends upwardly through a suitable axial opening in the hand wheel 112. The rack carries at its upper end a cup-shaped housing 128 which is formed with an annular flange 130 to receive bolt members 132 that secure the same to the annular flange 134 of an elongated cup-shaped screw housing 136. The housing 136 is provided with an axial screw threaded opening 138 through its upper end to receive a screw member 140. The screw member 140 carries at its upper end the top bar 24 upon which the saddle or supporting member is positioned. It will be noted that the top bar 24 is formed with a socket 24a to receive a centering stud 26a on the saddle. The saddle is further provided with downwardly depending ears 26b which straddle the bar 24, thus effectively preventing displacement or removal of the saddle 26 from the bar 24 when in use, yet permitting the same to be easily removed manually by lifting the saddle from the bar.

From the above description of the adjusting means, it will be apparent that by grasping the member 136, the bar 126 may be raised in the support member 18 to a point adjacent the lower part of an automotive vehicle to be raised. Minute adjustment can then be obtained by turning the hand wheel 112 and revolving the member 136 about the stationary screw member 140.

In order to provide the convenience of being able to move the car-rocking device about without lifting and carrying the same, I have provided the wheel members 142 mounted upon a shaft 144 carried by a pair of lugs 146 that are formed integral with the base member 34. In this way it can be seen that by slightly tilting the car-rocking device, the wheels will come in contact with the surface upon which the same is positioned and the car-rocking device may be rolled about from one position to another with comparative ease.

The cylinder 10 as shown in Fig. 6 may be provided with the plug members 10a and 10b so that the chamber 70 may be accessible for cleaning or other purposes when desired.

In Fig. 9 I have shown a modified form of the invention in which the wheels 142 are directly mounted upon the lower end of a cylinder 148. In this construction no sub-base 34 is provided. Since it is desirable in the trade and especially where inclined surfaces are not encountered in pits, to provide a cylinder which is not furnished with an auxiliary base, I also contemplate the provision of the form of cylinder shown in Fig. 9.

From the above and foregoing description it will be apparent to those skilled in the art that I have provided a highly improved car-rocking device, one that is easily operated by the average attendant in gas stations, garages or repair shops and one that will not easily become broken or out of order.

While I have illustrated and described a specific embodiment of the invention, it will be apparent to those skilled in the art that changes and modifications may be made in the exact details shown, and I do not wish to be limited in any particular, rather what I desire to secure and protect by Letters Patent of the United States is:

1. Apparatus of the class described comprising a cylinder having a rounded bottom wall, a lateral encircling flange on said cylinder above said bottom wall, a base having a seat to receive said bottom wall and a flat bottom surface, an upright encircling flange on said base, a ring member secured to said upright flange overlying the lateral flange of said cylinder and loosely connecting said cylinder and base, a pair of wheels mounted on the side of said base, said cylinder having a reciprocating piston thereon, a source of compressed air for said cylinder, valve means therein for directing compressed air alternately below or above said piston, a support member secured to said piston and extending upward through said cylinder, adjusting means associated therewith for changing the length of the same and a removable saddle positioned on the upper end of said support member.

2. Apparatus of the class described comprising a cylinder having a rounded bottom wall, a lateral encircling flange on said cylinder above said bottom wall, a base having a seat to receive said bottom wall and a flat bottom surface, an upright encircling flange on said base, a ring member secured to said upright flange overlying the lateral flange of said cylinder and loosely connecting said cylinder and base, said cylinder having a reciprocating piston thereon, a source of compressed air for said cylinder, valve means therein for directing compressed air alternately below or above said piston, a support member secured to said piston and extending upward through said cylinder, adjusting means associated therewith for changing the length of the same and a removable saddle positioned on the upper end of said support member.

3. Apparatus of the class described comprising a cylinder having a rounded bottom wall, a lateral encircling flange on said cylinder above said bottom wall, a base having a seat to receive said bottom wall and a flat bottom surface, an upright encircling flange on said base, a ring member secured to said upright flange overlying the lateral flange of said cylinder and loosely connecting said cylinder and base, said cylinder having a reciprocating piston thereon, a source of compressed air for said cylinder, valve means therein for directing compressed air alternately below or above said piston and a support member secured to said piston and extending upward through said cylinder.

MARTIN RASCH.